United States Patent Office 3,564,033
Patented Feb. 16, 1971

3,564,033
TRICYCLOHEXYLTIN HALIDE PROCESS
Gerald H. Reifenberg, Hightstown, and William J. Considine, Somerset, N.J., assignors to M & T Chemicals Inc., New York, N.Y., a corporation of Delaware
No Drawing. Filed Nov. 4, 1968, Ser. No. 773,331
Int. Cl. C07f 7/22
U.S. Cl. 260—429.7
3 Claims

ABSTRACT OF THE DISCLOSURE

The process of this invention for preparing tricyclohexyltin halide $(C_6H_{11})_3SnX$ wherein X is selected from the group consisting of chloride and bromide, comprises a first step of forming phenyltin trihalide by reacting as reactants tetraphenyltin and tin tetrahalide thereby forming phenyl trihalide, a second step of preparing tricyclohexylphenyltin by reacting as reactants said phenyltin trihalide prepared in said first step with cyclohexyl magnesium halide in an amount of at least three moles of cyclohexyl magnesium halide per mole of phenyltin trihalide to form said tricyclohexylphenyltin and a third step of reacting as reactants said tricyclohexylphenyltin prepared in said second step and tin tetrahalide to produce said tricyclohexyltin halide.

---

This invention relates to a novel process for the preparation of organotin compounds. More specifically, this invention relates to a process characterized by improved yields of specific products.

Another object of this invention is to provide a process for forming tricyclohexyl halide without the concomitant formation of other undesirable cyclohexyltins.

The process of this invention for preparing tricyclohexyltin halide $(C_6H_{11})_3SnX$ wherein X is selected from the group consisting of chloride and bromide, comprises a first step of forming phenyltin trihalide by reacting as reactants tetraphenyltin and tin tetrahalide thereby forming phenyl trihalide, a second step of preparing tricyclohexylphenyltin by reacting as reactants said phenyltin trihalide prepared in said first step with cyclohexyl magnesium halide in an amount of at least three moles of cyclohexyl magnesium halide per mole of phenyltin trihalide to form said tricyclohexylphenyltin and a third step of reacting as reactants said tricyclohexylphenyltin prepared in said second step and tin tetrahalide to produce said tricyclohexyltin halide.

According to another of its aspects, this invention is a process for preparing a tricyclohexyltin halide $$(C_6H_{11})_3SnX$$

by the reaction of a phenyltricyclohexyltin $$(C_6H_5)Sn(C_6H_{11})_3$$

with tin tetrahalide $SnX_4$ wherein X is a halogen selected from the group consisting of chloride and bromide, comprising reacting as reactants tricyclohexylphenyltin and tin tetrahalide, thus forming tricyclohexyltin halide.

The tricyclohexyltin product $(C_6H_{11})_3SnX$ which is formed in high yields by practice of this invention may include products wherein the cyclohexyl group, designated $C_6H_{11}$, may be inertly substituted. Typical products which may be formed under the process of this invention, in addition to tricyclohexyltin bromide and tricyclohexyltin chloride may include: tri - 3 - methylcyclohexyltin chloride, tri(4 - butyl cyclohexyl) tin chloride, tri(3 - phenyl cyclohexyl) tin chloride, tri(3,3,5 - trimethyl cyclohexyl) tin chloride, tri(3,3,5 - cyclohexyl) tin chloride, tri(3,5-dimethyl cyclohexyl) tin chloride, tri(4 - t - butyl cyclohexyl) tin chloride, tri(4 - isopropyl - 5 - methyl cyclohexyl) tin chloride, tri(3,5 - dimethyl cyclohexyl) tin chloride, tri(3,4 - dimethyl cyclyohexyl) tin chloride, together with the corresponding bromide derivatives.

The tin tetrahalide which may be used in the practice of this invention may be $SnX_4$, wherein X is an active halide selected from the group consisting of chloride and bromide. Preferably, $SnX_4$, may be tin tetrachloride, $SnCl_4$.

In the first step in the practice of this invention phenyltin trihalide is formed by the reaction of tetraphenyltin and tin tetrahalide. In the practice of the first step of this invention the reaction between tetraphenyltin and tin tetrahalide may be as follows:

$$(C_6H_5)_4Sn + 3SnCl_4 \rightarrow 4(C_6H_5)SnCl_3$$

This reaction may be carried out by adding to the reaction vessel at least three moles of tin tetrahalide per mole of tetraphenyltin. The rapid addition should be followed by heating the reaction mixture to a temperature of 195° C.–205° C. for a period of 90 minutes to 150 minutes. The product may be recovered by conventional means, e.g. filtration and distillation.

The second step of the practice of this invention comprises the preparation of tricyclohexylphenyltin by the reaction of the phenyltin halide product of the first step with cyclohexyl magnesium halide in an amount of at least three moles per mole of phenyltin trihalide. The exact ratio of Grignard reagent to phenyltin trihalide is not critical. To minimize the concomitant formation of undesirable cyclohexyltins an excess of Grignard reagent is desirable.

In the practice of the second step of this invention the reaction between phenyltin trihalide and cyclohexyl magnesium halide may be as follows:

$$(C_6H_5)SnCl_3 + 3(C_6H_{11})MgCl \rightarrow (C_6H_{11})_3Sn(C_6H_5) + 3MgCl_2$$

As noted above, the molar ratio of cyclohexyl magnesium halide to phenyltin trihalide is not critical except that to obtain the high yields of this invention at least three moles of cyclohexyl magnesium halide should be used per mole of phenyltin trihalide. Preferably, the exothermic reaction mixture of the second step may be maintained at a temperature of 25° C. to 95° C., preferably less than 80° C. The reaction time may be varied from 60 minutes to 150 minutes. The cyclohexyl phenyltin product may be recovered by convention means, e.g. extraction and distillation.

The high boiling inert hydrocarbon solvent such as xylene or toluene may be added and the ether removed before phenyltin trihalide is added. In this way, a mixture is produced which is comparatively easy to handle. If the process is carried out by adding high boiling inert hydrocarbon and phenyltin trihalide to the ether solution and subsequently distilling out the ether to permit the reaction to be conducted at high temperature, there results a viscous mixture which is hard to handle.

The Grignard reagent used in the practice of the second step of the process of this invention, cyclohexyl magnesium halide, including Grignard reagents containing inertly substituted cyclohexyl radicals noted above, may be prepared by the reaction of a cyclohexyl halide with magnesium according to the following reaction:

$$(C_6H_{11})X + Mg \rightarrow (C_6H_{11})MgX$$

This reaction is preferably carried out under an inert atmosphere, e.g. nitrogen gas, in the presence of an aliphatic ether such as diethyl ether, di-n-butyl ether, etc., or in the presence of a cyclic ether. Various initiators may be present to facilitate the formation of the Grignard reagent. The Grignard reagent may be in the form of a solution of its complex with an ether.

The reaction mixture may be then hydrolyzed to isolate the intermediate tricyclohexylphenyltin, typically this may be effected by adding an aqueous solution of citric acid, resulting in a two-phase system. The organic layer of the two-phase system may be operated as by decantation. The organic layer may be stripped of solvent by distillation. The distillate may be effected in atmospheric pressure.

In the practice of the third step of this invention, the preparation of tricyclohexyltin halide, the reaction of tricyclohexylphenyltin and tin tetrahalide in a substantially unimolar ratio may be as follows:

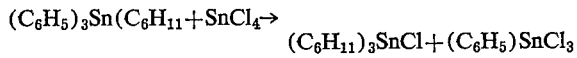

The reaction temperature of the third step of this process ranges from 0° C. to 120° C. The time of reaction ranges from 30 minutes to 90 minutes.

The tricyclohexylphenyltin may be added in the form of a solution. Typical solvents include xylene, heptene, hexene, etc. The reaction medium at any given time may be considered as having been formed by mixing reactants in equivalent molar proportions.

The reaction mixture, after being refluxed, generally consists of two phases. The solvent may be removed from the upper phase by distillation. The product tricyclohexyltin halide may be removed from the distillate by filtration.

Practice of this invention may be observed by reference to the following example in which the process of this invention has been applied, but it is not to be construed as limiting the broader aspects of this invention.

EXAMPLE 1

In the preparation of phenyltin tricholride a 5 liter three-necked flask equipped with an air motor, stirrer, water condenser, thermometer, drying tube, and nitrogen inlet tube was charged with 2135.5 grams (5.0 moles) of tetraphenyltin. 3907.5 grams (15.0 moles) of the tetrachloride was rapidly added. The reaction mixture was heated to 200° C. and maintained at this temperature for two hours. The mixture was filtered and after which time the filtrate was separated. An insoluble filtered cake was discarded. The filtrate was distilled to yield a phenyltin trichloride product exhibiting a weight of 5423 grams, a boiling point range of 84° C.–91° C., and an index of refraction 1.5836 to 1.5868.

In the practice of the second step, the preparation of tricyclohexylphenyltin, the Grignard reagent was prepared by adding 62.0 grams (2.55 moles) of magnesium turnings, to a reaction vessel which was purged with nitrogen gas. 100 milliliters of tetrahydrofuran were added with an initiation mixture containing 6.0 grams (0.5 mole) of cyclohexyl chloride and 4.3 grams (0.5 mole) of cyclohexyl bromide. To the reaction mixture there was slowly added a mixture containing 289.9 grams (2.43 moles) of cyclohexyl chloride and 1350 milliliters of tetrahydrofuran. At the end of the addition, the reaction was allowed to proceed exothermically for two hours, and then cooled to 40° C. A charge solution containing 202.0 grams (0.67 mole) of phenyltin trichloride, prepared supra in 600 milliliters of benzene was added to the reaction mixture over a 30 minute time increment. The reaction mixture was maintained at a general reflux for 150 minutes after which time the reaction mixture was cooled to room temperature and hydrolyzed with an aqueous solution with 120 grams of citric acid in 1200 milliliters of water. The reaction mixture was then separated into a two-phase system, which system was filtered to remove undissolved magnesium metal. The filtrate was transferred to a separatory funnel, the aqueous layer was separated and extracted with 1350 milliliters of benzene. The solvent was removed by distillation and 195 grams of tricyclohexylphenyltin, a 66% yield, exhibiting a melting point range of 188.5° C.–192° C., was obtained.

In the third step, the preparation of tricyclohexyltin chloride, a solution of 26.8 grams (0.06 mole) of tricyclohexylphenyltin, prepared above, in 40 milliliters of xylene was charged to a reaction vessel. The solution was cooled to −20° C. by placing the reaction vessel in an ice-methanol bath. A solution of 15.7 grams (0.06 mole) of tin tetrachloride in 10 milliliters of xylene were rapidly added. The reaction mixture was refluxed for 30 minutes and then cooled to room temperature, at which point the reaction mixture consisted of two phases, a semi-solid lower phase and a liquid upper-phase. The phases were separated and the solvent removed from the upper phase by distillation to obtain white crystals and an amber liquid. The white crystals were separated from the liquid by filtration. The white crystals, tricyclohexyltin chloride, after washing with methanol exhibited a weight of 20.0 grams, and a melting point of 124° C.–125° C. Vapor phase chromatographic analysis showed tricyclohexyltin chloride to be 98% pure.

While the invention has been described with particular reference to a specific embodiment, it is to be understood that it is not to be limited thereto, but is to be construed broadly and restricted solely by the scope of the appended claims.

We claim:

1. A process for preparing tricyclohexyltin halide $(C_6H_{11})_3SnX$ wherein X is selected from the group consisting of chloride and bromide, comprising a first step of forming phenyltin trihalide by reacting as reactants tetraphenyltin and tin tetrahalide thereby forming phenyltin trihalide, a second step of preparing tricyclohexylphenyltin by reacting as reactants said phenyltin trihalide prepared in said first step with cyclohexyl magnesium halide in an amount of at least three moles of cyclohexyl magnesium halide per mole of phenyltin trihalide to form said tricyclohexylphenyltin and a third step of reacting as reactants said tricyclohexylphenyltin prepared in said second step and tin tetrahalide to produce said tricyclohexyltin halide.

2. The process of claim 1 wherein said tricyclohexyltin halide is tricyclohexyltin chloride.

3. The process of claim 1 wherein at least a portion of said phenyltin trihalide reactant of said second step of claim 1 is the by-product phenyltin trihalide of said third step of claim 1.

References Cited

UNITED STATES PATENTS

| | | | |
|---|---|---|---|
| 3,248,411 | 4/1966 | Neuman et al. | 260—429.7 |
| 3,355,468 | 11/1967 | Hirshman et al. | 260—429.7 |
| 3,355,470 | 11/1967 | Natoli | 260—429.7 |
| 3,432,531 | 3/1969 | Natoli | 260—429.7 |

TOBIAS E. LEVOW, Primary Examiner

W. F. W. BELLAMY, Assistant Examiner